United States Patent [19]

Koinuma

[11] 3,798,673

[45] Mar. 19, 1974

[54] AC BIAS CONTROL RECORDING SYSTEM AND APPARATUS IN A MAGNETIC RECORDING APPARATUS

[75] Inventor: Kazuo Koinuma, Yokohama, Japan

[73] Assignee: Victor Company of Japan, Ltd., Yokohama City, Japan

[22] Filed: Dec. 7, 1971

[21] Appl. No.: 205,530

[30] Foreign Application Priority Data

Dec. 19, 1970 Japan .............................. 45-114832

[52] U.S. Cl. ..............................360/66, 360/24

[51] Int. Cl. .......................... G11b 5.02, G11b 5/44

[58] Field of Search........... 179/100.2 R, 100.2 MD, 179/100.2 K; 340/174.1 G; 330/91; 331/183

[56] References Cited

UNITED STATES PATENTS

| | | | |
|---|---|---|---|
| 2,628,287 | 2/1953 | Haynes | 179/100.2 R |
| 3,262,124 | 7/1966 | Johnson et al. | 179/100.2 R |
| 3,394,234 | 7/1968 | Grace | 179/100.2 R |
| 3,381,098 | 4/1968 | Pezirtzoglou | 179/100.2 R |
| 3,032,612 | 5/1962 | Goldmark | 179/100.2 R |
| 3,368,032 | 2/1968 | Gooch et al. | 179/100.2 R |
| 3,084,224 | 4/1968 | Sanford | 179/100.2 R |

*Primary Examiner*—Bernard Konick
*Assistant Examiner*—Alfred H. Eddleman
*Attorney, Agent, or Firm*—Holman & Stern

[57] ABSTRACT

An AC bias control recording system and apparatus are adapted for use in a magnetic recording apparatus in which an input signal is recorded with an AC bias signal superposed thereon. According to the system and apparatus, the value of the current of the AC bias signal is controlled so that it is normally maintained relatively small and becomes relatively large only when the input signal to be recorded includes a low frequency signal component of a high level. The system and apparatus generally comise means for generating the AC bias signal, means for obtaining a control signal from the low frequency signal component in the input signal to be recorded, means for controlling the AC bias signal current by the control signal, and means for superposing the AC bias signal thus controlled upon the input recording signal and recording the same on a magnetic medium.

4 Claims, 7 Drawing Figures

AC BIAS CONTROL RECORDING SYSTEM AND APPARATUS IN A MAGNETIC RECORDING APPARATUS

This invention relates to an AC bias control recording system in a magnetic recording apparatus and, more particularly, to a recording system in a magnetic recording apparatus such as a tape recorder in which an AC bias signal current is controlled in response to the level of a low frequency signal component in an input signal to be recorded (hereinafter referred as an input recording signal) and the input recording signal upon which this controlled AC bias signal is superposed is recorded.

As will be described in detail later in conjunction with the accompanying drawings, in an AC bias recording system in which recording is effected by superposing an AC bias signal upon an input recording signal, the reproduced level and the amount of distortion of the recorded and reproduced signal generally show different values in accordance with the value of the current of the AC bias signal at the recording time. Generally, if a large AC bias current is used in recording, the reproduced output level of a particularly high frequency signal component is lowered to a large extent, whereas if a small AC bias current is used in recording, a distortion in the reproduced signal, particularly, in low frequency signal component, increases.

It is, therefore, desirable that the value of the AC bias current should be relatively small for maintaining a large reproduced output level but it should be relatively large for descreasing the distortion of the reproduced signal in the low frequency signal component. Accordingly, a compromise point between the two contradictory phenomena has been sought in the prior art AC bias recording system and the AC bias current has been set at a value which satisfies this compromise point. However, this prior art system in which the value of the AC bias current is set at this compromise point is disadvantageous in that the reproduced output level of the high frequency component cannot amount to a sufficiently high value, whereas the distortion of the reproduced low frequency signal component cannot be made sufficiently small.

It is, therefore, a general object of the invention to provide a novel and useful recording system and apparatus for a magnetic recording apparatus which have eliminated the above described disadvantage of the conventional system. In the system and apparatus according to the invention, the value of the AC bias current is controlled in response to a level of low frequency signal component in the input recording signal. Thereby, the signal is recorded so that the signal will be reproduced with a sufficiently high output level in the high frequency component and a sufficiently small distortion in the low frequency signal component.

Another object of the invention is to provide a system and an apparatus in which the value of the AC bias current to be superposed upon a recording signal is normally set at a relatively small value so that the high frequency signal component may be reproduced at a large output level and is adjusted so that it becomes relatively large only when a low frequency signal component of a relatively high level exists in the input recording signal.

A further object of the invention is to provide a system and an apparatus in which a signal is recorded in such a manner that the level of the high frequency signal component is increased by using a compressor of a conventional compression and expansion system when a low frequency signal component of a relatively high level exists in the recording signal. According to this system and apparatus, the signal can be recorded so that the low frequency component with a small distortion and the high frequency component with a high output level can be reproduced.

Other objects and features of the invention will become apparent from the description made hereinbelow with reference to the accompanying drawings, in which.

Figure 1:
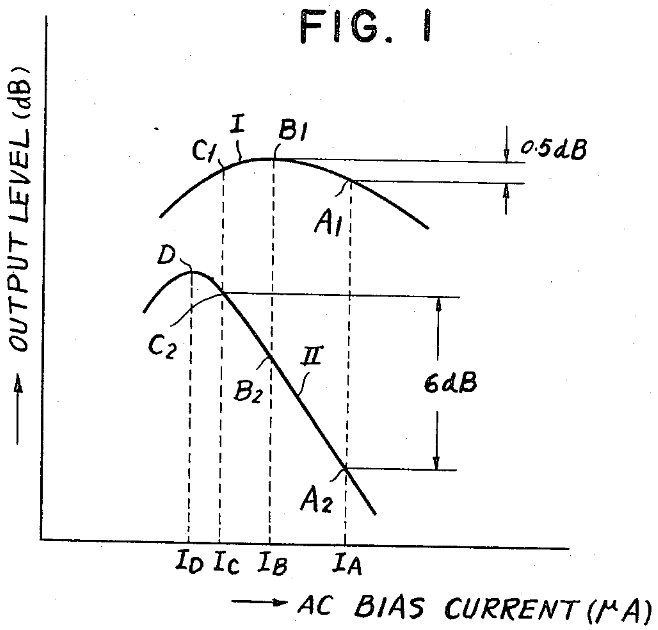
FIG. 1 is a diagram showing an AC bias current - reproduced output signal level characteristic with the frequency of the recording signal taken as a parameter.

In the AC bias recording system, the level, the amount of distortion and a frequency-response characteristic of a signal recorded on a magnetic tape vary in accordance with the value of the AC bias current which is superposed upon the recording signal during recording. When the recording signal having a constant level is recorded on the magnetic tape with the AC bias current having various values superposed thereon, the characteristic of the output level of the reproduced signal is represented by a convex curve which has a peak value at a certain AC bias current value in a diagram in which the axis of abscissas represents the AC bias current and the axis of ordinates represents the output level. This characteristic is shown in FIG.1. The curve I is a reproduced output level characteristic curve when a low frequency recording audio signal having a frequency of 400 $H_z$ and a constant level is recorded and reproduced. The curve II is a reproduced output level characteristic curve when a high frequency recording audio signal having a frequency of 10 KHz and a constant level is recorded and reproduced. It is also well known that a value of the AC bias current at which distortion of the reproduced signal is at the minimum is greater than the aforementioned value of the AC bias current at which the reproduced output level is at the maximum and that the higher the frequency of the recording signal, the smaller is the value of the AC bias current corresponding to the maximum reproduced output level.

Since the value of the AC bias current corresponding to the minimum distortion point is larger than the value of the AC bias current corresponding to the maximum reproduced output level point, the distortion is taken into consideration as a important factor upon setting of the AC bias current. And the AC bias current is normally set at a value which is larger than the value of the AC bias current corresponding to the maximum reproduced output level of a low frequency signal and at which the output level is lower than its maximum value approximately by 0.5 dB to 1 dB.

Figure 2:
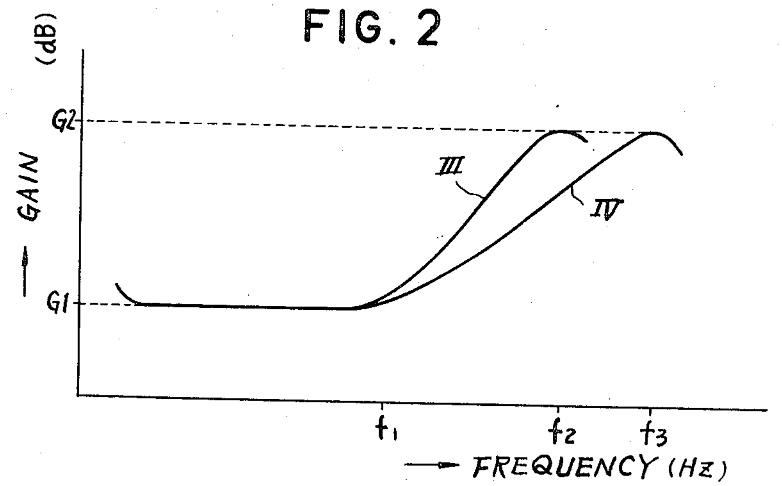
FIG. 2 is a diagram showing a frequency characteristic of the gain of a recording amplifier.

In FIG.1, a point $A_1$ on the curve I is a point the output level of the low frequency audio signal component corresponding to the normally set value $I_A$ of the AC bias current. It will be noted that the curve I is relatively gently-sloping. In FIG.2, the value $I_D$ of the AC bias current corresponding to the peak point D of the reproduced output level is smaller than the value $I_B$ of the AC bias current corresponding to the peak point $B_1$ of the output level in the curve I. Further, the curve II has a characteristic in which the output level drops sharply in a range larger than the value $I_D$ of the AC bias current. Accordingly, if the AC bias current for the recording signal is set at a value larger than the current value $I_B$ corresponding to the peak output level $B_1$ of the low frequency audio signal component, for example $I_A$, the output level of the high frequency audio signal component becomes extremely low as indicated by the point $A_2$. In this case, the output level of the high frequency audio signal component is extremely low as compared with the output level of the middle audio frequency component.

The drop in the output level of the high audio frequency signal due to the above described characteristic can be improved by decreasing the set value of the AC bias current. If, for example, the set value of the AC bias current is selected at a suitable value $I_C$ which is between the AC bias current value $I_B$ and the value $I_D$, and an output level indicated by a point $C_1$ which approximates the peak output level $B_1$ (strictly speaking, slightly smaller than $B_1$) is obtained with respect to the low audio frequency signal component. As regards the high audio frequency signal component, an output level indicated by a point $C_2$ which is higher than the output level shown by the point $A_2$ by 6 dB is obtained. If, however, the value of the AC bias current is always set at such a small value, distortion in the reproduced low frequency signal component will increase, though the output level of the high frequency signal component will increase as described above. For this reason, setting of the value of the AC bias current at a small value has not been employed because the advantage of increase in the output level of the high frequency signal component does not compensate for the disadvantage of increase in the distortion of the reproduced signal in low frequency signal component. Accordingly, the value of the AC bias current has been set at the greatest possible value within a range of compromise between the above described two contradictory phenomena, namely the decrease in the distortion of the low audio frequency signal component and the increase in the reproduced output level of the high frequency signal component.

If, however, the output level of the high frequency component is increased in the magnetic recording and reproducing, it becomes possible to extend a compensation characteristic of the high frequency component in a recording amplifier to a high frequency component. Then, recording and reproduction of audio signal over wider frequencies will become possible. When, for example, a gain G2 of the recording amplifier is constant, if a gain G1 of the low frequency component is constant, a gain (G2-G1) used for characteristic compensation of the high frequency component becomes constant. Accordingly, if a roll-off frequency $f_1$ is constant, the slope of the characteristic compensation curve in high frequencies is made gentle by an amount of increase in the output level of the high frequency signal component recorded on the magnetic signal In this case, the value of the highest frequency of the recorded and reproduced signal becomes a frequency $f_3$ which is higher than a frequency $f_2$ of a low output level of the high frequency signal (the curve III). It is, therefore, desirable to increase the output level of the high frequency signal component.

In the meanwhile, the probability that the amplitude of a low frequency signal becomes large in an audio signal which becomes an object of recording and reproduction is very large. Mr. Benjamin B. Bauer's article on the U.S. Magazine "Journal of the Audio Engineering Society," April, 1970 issue, Volume 18, Number 2, Page 165 to 172 shows a result of an experiment which was made by dividing a frequency band of 30 Hz to 16 KHz into nine bands, recording change of the level for each band, seeking a level at which the period of the peak value does not exceed 99% of the whole period and studying relation between each frequency band and its level with respect to a real music sound. In view of the fact that the level of the low audio frequency signal component remains low during most of the period (99% to 99.9% of the whole period), it will simply seem that recording can be made with a high output level of the high frequency signal component if the value of the AC bias current to be superposed upon the signal current during recording is set at a smaller value than has been normally used, so long as the distortion which occurs during an extremely short period of time is allowed. According to the investigation made by the aforementioned article, the distortion which takes place only during such a short period of times as 0.1% to 1% of the whole period cannot be practically ignored and accordingly, the magnetic recording system as described above is not practicable.

According to the system and apparatus of the invention the value of the AC bias current to be superposed upon the recording signal current during recording is usually kept small and is made large only when the low frequency signal component in which distortion becomes a problem increases in the signal which is the object of recording and reproduction. Thereby, the high frequency signal can be recorded on the magnetic tape so that the signal is reproduced in a high level without accompanying increase in the distortion due to the low frequency signal component.

Figure 4:
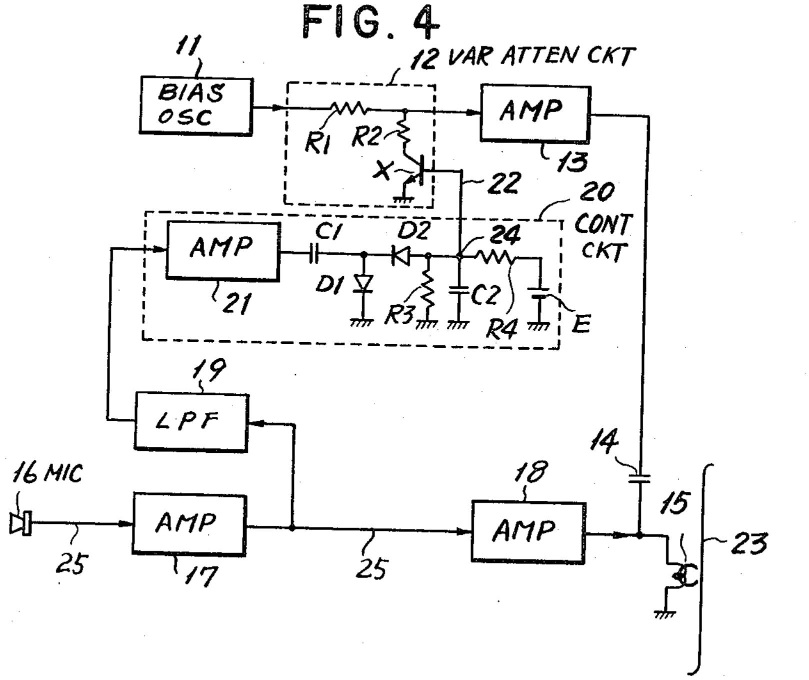
FIG. 4 is a block diagram showing one embodiment of the circuit of the apparatus which is capable of carrying out the AC bias control recording system according to the invention adapted to a magnetic recording apparatus.

FIG.4 is a block circuit diagram of one embodiment of an apparatus in which the AC bias automatic control system according to the invention is applied. An oscillation output generated from an AC bias current oscillator 11 is supplied to an amplifier 13 through a variable attenuation circuit 12 surrounded by a broken line. The output from the amplifier 13 is supplied to a magnetic recording head 15 as an AC bias current through a capacitor 14. The variable attenuation circuit 12 consists, for example, of resistors R1 and R2 and a transistor X used as a controlling element.

In the meanwhile, an input recording audio signal to be recorded is input from a microphone 16 provided as an input signal source and is transmitted through a transmission line 25 to recording amplifiers 17 and 18 in which the signal is amplified and given a necessary compensation. Then, the signal is supplied to the magnetic head 15 in which the above described AC bias current is superposed upon it for recording on a magnetic tape 23.

The output from the amplifier 17 is supplied, on the other hand, to a low-pass filter 19 and only a low frequency component of about 1 KHz or below, for example, which has passed through the low-pass filter 19 is supplied to an amplifier 21 in a control circuit 20 surrounded by a broken line. The control circuit 20 comprises the amplifier 21, a capacitor C1, rectifying diodes D1 and D2, a resistor R3, a capacitor C2, a resistor R4,and a bias voltage source E etc. When there is no signal supplied to the control circuit 20, namely there is no low frequency component in the input recording signal, the positive voltage of the bias voltage source E is applied to the base of the transistor X in the variable attenuation circuit 12 through a resistor R4 and a line 22. Accordingly, the transistor X is in a conductive state. In this state, the oscillation output from the oscillator 11 which passes through the variable attenuation circuit 12 is attenuated to a large extent and the value of the AC bias current supplied to the magnetic head 15 is maintained at a small value.

When a signal is applied from the low-pass filter 19 to the control circuit 20, namely there is a low frequency component in the input recording signal, the signal from the low-pass filter 19 is amplified at the amplifier 21 and, rectified in a rectifying circuit consisting of the diodes D1 and D2 through the capacitor C1. The signal is then smoothed into a negative DC voltage in a smoothing circuit consisting of the resistor R3 and the capacitor C2. The positive voltage applied by the voltage source E to a point 24 through the resistor R4 is cancelled by the aforementioned negative voltage. Accordingly, the control voltage applied from the point 24 to the base of the transistor X through the line 22 is reduced by the value of the negative DC voltage. The internal resistance in the transistor X increases due to decrease in the control voltage applied to the base thereof. Consequently, the amount of attenuation in the oscillation output from the oscillator 11 which has passed the variable attenuation circuit 12 decreases, thereby increasing the value of the AC bias current supplied to the magnetic head 15.

Accordingly, in case there is substantially no low frequency signal component (including a case wherein there is no low frequency signal component having a level above a predetermined level) in the recording signal which is input from the microphone 16, the input recording signal is recorded with a small value of the AC bias current so that the high frequency signal component may be reproduced at a sufficiently high output level. In case there is substantially a low frequency signal component above a predetermined level in the input recording signal, the input recording signal is recorded with a relatively large value of the AC bias current which is of a degree at which the distortion of the low frequency signal component in the reproduced signal forwards no serious problem. Accordingly, when there is a low frequency component in the input recording signal, the input signal can be recorded so that no substantial distortion is produced in the low frequency signal component and the high frequency signal component will be reproduced at about the same level as in the prior art system. When there is no low frequency signal component in the input signal, the input signal can be recorded so that the high frequency signal component will be reproduced at a greater output level than in the conventional system.

In order for the above described operation to be properly carried out, a response time of the control circuit 20 should be set at a proper value. For this purpose, the output impedance of the amplifier 21, the values of capacitance of the capacitors C1 and C2, the value of resistance of the resistor R3 etc. are properly selected so as to shorten an attack time and lengthen a recovery time of the control circuit 20. The result of a listening test has revealed that the attack time of approximately 2 to 3 milliseconds and the recovery time of approximately 0.1 second are preferable.

Figure 5:
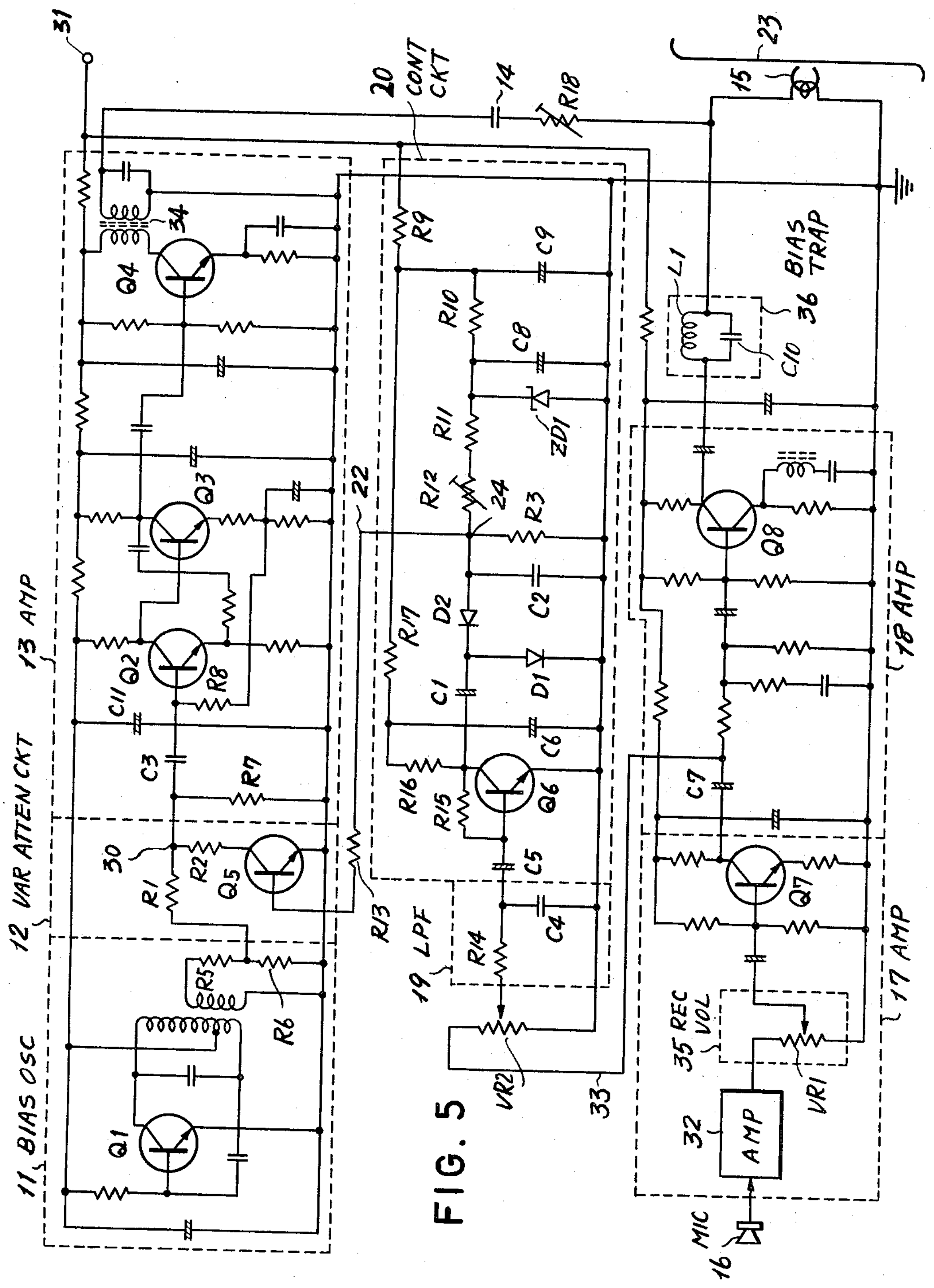
FIG. 5 is a circuit diagram showing one concrete embodiment of the electric circuit shown in the block diagram in FIG. 4.

An embodiment of a concrete electric circuit constructed on the basis of the block circuit diagram shown in FIG.4 is shown in FIG.5. In FIG.5, the same circuit parts as those shown by the full or broken lines in FIG.4 are surrounded by broken line and designated by the same reference numerals as used in FIG.4. The circuit of the present embodiment is a circuit applied to a cassette type tape recorder in which a tape speed is relatively low.

The oscillator 11 comprises a transistor Q1 and generates a sine wave having a frequency of about 70 KHz. This oscillated output is divided in voltage by resistors R5 and R6 and appears at a point 30 through the resistor R1. The voltage at the point 30 is selected at about 10 to 30 millivolts. If the voltage level at the point 30 is selected at a larger value, distortion increases while the amplification degree of the amplifier 13 at the next stage can be made smaller. Accordingly, the voltage level is selected at the aforementioned value. If the amplifier 13 consisting of transistors Q2 and Q3 is not a flat amplifier but a selective amplifier having a circuit which resonates at the same frequency as the bias frequency, the voltage level at the point 30 may be set at about 100 millivolts.

The amplifier 17 comprises an amplifier 32, an adjust volume 35 consisting of a variable resistor VR1 and a transistor Q7. The collector output of the transistor Q7 is transmitted through a capacitor C7 and is supplied, on one hand, to the low-pass filter 19 consisting of a resistor R14 and a capacitor C4 through a line 33 and a variable resistor VR2. The output low frequency component from the low-pass filter 19 is applied to the base of a transistor Q6 through a capacitor Q5.

The collector output of the low frequency component amplified at the transistor Q6 is rectified at the diodes D1 and D2 through the capacitor C1 and smoothed into the negative DC voltage in the circuit consisting of the resistor R3 and the capacitor C2. A positive voltage is applied from a terminal 31 connected to a voltage source of +20 volts to a point 24 through resistors R9, R10, R11 and R12. This positive voltage is stabilized by a Zener diode ZD1. The control voltage appeared at the point 24 which is a sum of the aforementioned negative voltage and the positive voltage is applied through the line 22 and a resistor R13 to the base of a transistor Q5 (corresponding to the transistor X in FIG.4) of the variable attenuation circuit 12. As the transistors Q5 and Q6, silicon transistors for small signals are used. As the diodes D1 and D2, silicon diodes for small current are used.

The output of the oscillator 11 is subject to a variable attenuation control in the variable attenuation circuit 12 as described above. Then, the signal is amplified at the amplifier 13 and is obtained through a transformer 34 the primary winding of which is connected to the collector of the transistor Q4. The AC bias current thus obtained is supplied to the magnetic head 15 through a capacitor 14 and a resistor R18.

On the other hand, the recording signal taken out from the transistor Q7 of the amplifier 17 is further amplified at the amplifier 18 which comprises a transistor Q8. The output of the amplifier 18 is supplied to the magnetic head 15 through a bias trap circuit 36 consisting of a coil L1 and a capacitor C10. The AC bias is superposed upon the recording signal which has passed the bias trap circuit 36 and the signal is recorded on the magnetic tape 23. The bias trap circuit 36 is a circuit for preventing the AC bias current transmitted from the amplifier 13 from flowing to the amplifier 18.

Constant of each circuit element used in the foregoing embodiment is as follows:

RESISTOR

| | |
|---|---|
| R1 | 5.6 kΩ |
| R2 | 1 KΩ |
| R3 | 10KΩ |
| R5 | 100KΩ |
| R6 | 2.2 K |
| R7 | 150 KΩ |
| R8 | 100 KΩ |
| R9 | 560 Ω |
| R10 | 10 KΩ |
| R11 | 47 KΩ |
| R12 | 500 KΩ |
| R13 | 10 KΩ |
| R14 | 10 KΩ |
| R15 | 82 KΩ |
| R16 | 470 Ω |
| R17 | 220 Ω |
| R18 | 50 Ω |

CAPACITOR

| | |
|---|---|
| C1 | 4.7 μF |
| C2 | 4.7 μF |
| C3 | 0.01 F |
| C4 | 0.022 F |
| C5 | 4.7 μF |
| C6 | 100 μF |
| C7 | 4.7 μF |
| C8 | 33 μF |
| C9 | 33 μF |
| C10 | 220 PF |
| C11 | 100 μF |
| 14 | 150 PF |

INDUCTOR

| | |
|---|---|
| L1 | 22 mH |

In the circuit of the present embodiment, the magnetic head 15 is one in which the AC bias current $I_B$ shown in FIG.1 at which the output level with respect to a signal having a frequency of 400 Hz becomes maximum is 650 μA. In this case, the bias current $I_A$ which corresponds to the output level point $A_1$ which is lower than the peak point $B_1$ by 0.5 dB on the curve I is 800 μA, and the bias current $I_C$ which corresponds to the output level point $C_2$ which is higher than the point $A_2$ corresponding to the bias current $I_A$ by 6 dB on the curve II is 550 μA. The values of the bias currents $I_A$, $I_B$ and $I_C$ etc. are different according to the sort of the magnetic head. In the circuit of the present embodiment, the value of the bias current is varied within a range between about 550 μA and about 800 μA depending upon existence (or magnitude) of the low frequency component in the recording signal. In the past, the value of the AC bias current when using this magnetic head 15 was fixed at 800 μA. The relation between level of the low frequency signal component and the value of the bias current relative, for example, to a low frequency signal component of less than 200 Hz is as follows;

| | | |
|---|---|---|
| at less than | −15VU | 550μA |
| at | −10VU | 600μA |
| at | −5VU | 750μA |
| at | 0VU | 800μA |

Figure 3:
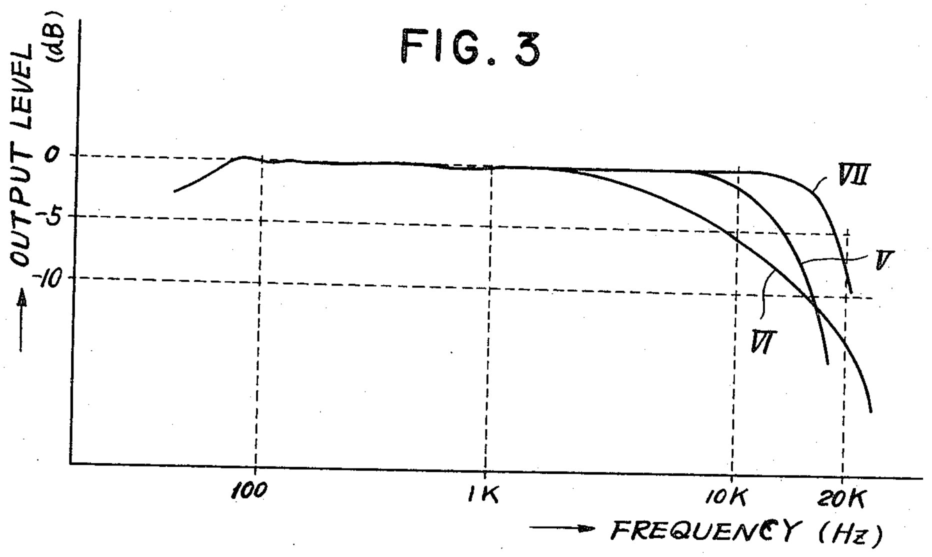
FIG. 3 is a diagram showing a frequency characteristic of the reproduced output signal level.

FIG.3 shows a frequency characteristic of the output level. The curve V shows a frequency characteristic of the output level of a signal recorded with an AC bias current fixed at 800 μA as in the prior art system. The curve VI shows a frequency characteristic of the output level when the AC bias current remains fixed at 800 μA and the frequency characteristic of the recording amplifier is one as shown by the curve IV in FIG.2. The curve VII shows a frequency characteristic of the output level when the recording amplifier having a characteristic as shown by the curve IV in FIG.2, is used and the AC bias current is made variable by the circuit according to the present invention. The characteristic curve shown in FIG.3 shows a result of a measurement made at a level of about −20VU.

If the limit to which the high frequency component can be used is −3dB, the frequency corresponding to −3dB is in the order of 11 KHz to 12 KHz in the curve V, whereas the frequency is 16 KHz to 17 KHz in the curve VII. From this, it will be apparent that the characteristic curve VII has a greater capability of reproducing the high frequency component.

In the circuit of the foregoing embodiment, NPN transistors are used as the transistors Q1 to Q8. However, PNP transistors may be used instead of these NPN transmistors. In this case, polarities of the diodes D1 and D2 and the Zener diode ZD1 are reversed to those shown in FIG.5 and the voltage applied to the terminal 31 is made a negative voltage.

Figures 6, 7:
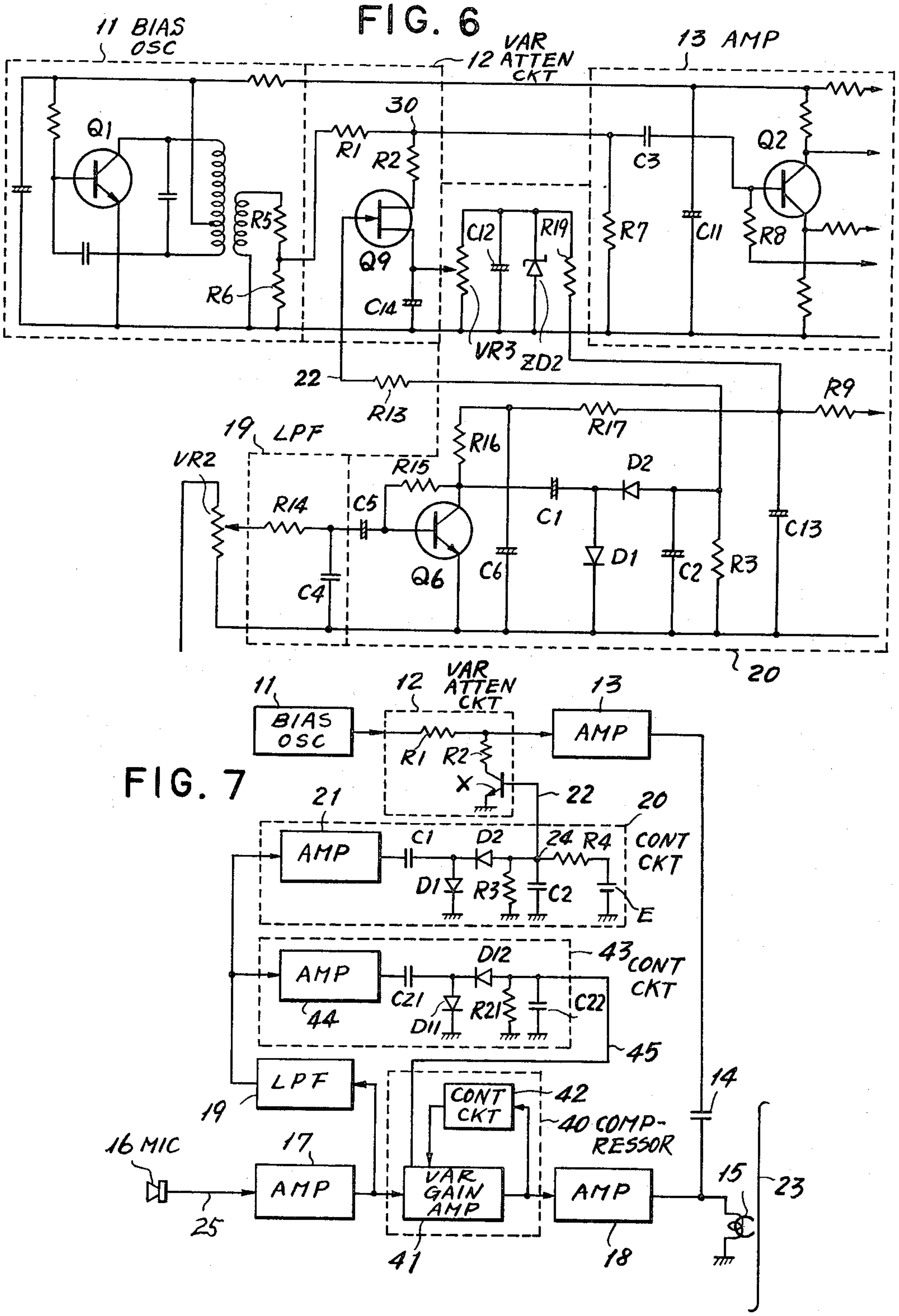
FIG. 6 is a circuit diagram showing a modification of a circuit in which a part of the circuit shown in FIG. 5 is modified.
FIG. 7 is a block diagram showing another embodiment of the apparatus according to the invention.

Instead of the transistor Q5, a field effect transistor (FET) may be employed. The essential part of the circuit in this case is shown in FIG.6. The circuit shown in FIG.6 is different from the circuit shown in FIG.5 only in a circuit which gives bias to a FET Q9. In FIG.6, the same component part is designated by the same reference characters as in FIG.5. Voltage from the terminal 31 of +20V is applied through resistors R9 and R19 to a Zener diode ZD2. The voltage stabilized at the Zener diode ZD2 is adjusted in its level by a variable resistor VR3 and applied to the source of the FET Q9. The variable resistor VR3 is adapted to adjust the voltage so that the internal resistance of the FET Q9 becomes sufficiently low when there is no signal passing through the transistor Q6. The FET Q9 has the control voltage from the control circuit 20 applied to its gate and operates in the same manner as the transistor Q5. Other part of circuit construction and operation are the same as in the circuit shown in FIG.5 and the description and illustration thereof are omitted.

Constants of the circuit elements used in the above described circuit are as follows:

RESISTOR

| | |
|---|---|
| R19 | 3.3 KΩ |

CAPACITOR

| | |
|---|---|
| C12 | 33 μF |
| C13 | 33 μF |

| | |
|---|---|
| C14 | 10 μF |

In the circuits of the embodiments shown in FIGS. 4 to 6, there is a problem that during a time when a low frequency signal component of a great amplitude (above a predetermined level) is included in the input recording signal, the recording signal is not recorded in such a manner that the high frequency signal component is reproduced at a high output level and the frequency characteristic in high frequencies is deteriorated. An embodiment in which this problem has been solved is shown in FIG.7. In the embodiment shown in FIG.7, the aforementioned problem has been settled by raising a gain for high frequencies in the amplifier system for the recording signal only during a time when the low frequency signal component of a great amplitude is included in the input recording signal.

In FIG.7, the same component parts are designated by the same reference numerals and the description thereof is therefore omitted. A compressor 40 which is of the same type as one used in an ordinary compression and expansion system is provided between the amplifier 17 and the amplifier 18. The compressor 40 consists of a variable gain amplifier circuit (or a variable attenuation circuit) 41 which changes an amplitude characteristic of the input signal from the amplifier 17 and a control circuit 42 which generates a control voltage for controlling the circuit 41 responsive to the level of the output signal of the circuit 41. The output of the amplifier 17 is supplied, on the other hand, to the low-pass filter 19. The low frequency signal component which has passed through the low-pass filter 19 is supplied, on one hand, to the first control circuit 20 as in the foregoing embodiments and supplied, on the other hand, to an amplifier 44 of a second control circuit 43. The low frequency signal component amplified at the amplifier 44 of th control circuit 43 is rectified by a rectifying circuit consisting of diodes D11 and D12 through a capacitor C21 and smoothed into a negative DC control voltage in a smoothing circuit consisting of a resistor R21 and a capacitor C22.

The control voltage obtained from the control circuit 43 is supplied to the variable gain amplifier circuit 41 of the compressor 40 through a line 45. The circuit 41 is controlled by the control voltage from the control circuit 43 and the control voltage from the control circuit 42. When the level of the high frequency component of the input recording signal from the microphone 16 is low, the variable gain amplifier circuit 41 makes a compressing control operation which is a normal function of a compressor due to the control voltage from the control circuit 42 so as to increase the level of the high frequency component by, for example, about 10 dB. Needless to say, an expander which makes an expanding operation on the signal compressed by the compressor must be provided in the reproduction system if the circuit of this embodiment is employed.

When there is a low frequency component of large amplitude in the input recording signal, the variable gain amplifier circuit 41 operates so as to increase the level of the high frequency component due to the control voltage supplied from the control circuit 43 through a line 45. Accordingly, even if there is a low frequency component of a large level in the input signal and the AC bias current increases, the recording signal is recorded with its enforced level of the high frequency component so that the reproduced level of the high frequency signal component is not lowered.

The control circuit 43 of the foregoing embodiment should of course be constructed so that the polarity of its output control voltage is a polarity at which the variable gain amplifier circuit 41 can be controlled. Depending upon the polarity of the control voltage required for the circuit 41, the control circuit 43 may also serve as the control circuit 20. Further, if a compressor of a frequency dividing type is used as the compressor 41, the low-pass filter contained in the compressor may be used instead of the low-pass filter 19 and therefore the low-pass filter 19 may be omitted.

Further, this invention is not limited to these embodiments but various variations and modifications may be made without departing from the scope and spirit of the invention.

What I claim is:

1. In a magnetic recording apparatus, an AC bias control recording system comprising a transmission line for transmitting an input signal to be recorded from an input signal source, means for generating a bias signal, a magnetic medium and means for superposing the bias signal upon the signal to be recorded and for magnetically recording said signal to be recorded on said magnetic medium, low pass frequency filtering means for filtering a low frequency signal component below a predetermined frequency from the input signal to be recorded, means coupled to said filtering means for obtaining a control signal representative of the magnitude of said low frequency signal component, said means coupled to said filtering means for obtaining the control signal comprising means for forming a control signal of DC voltage which is obtained by rectifying the output low frequency signal component from said filtering means, and control means responsive to the level of said control signal for maintaining the value of the bias signal relatively small when the input signal includes no low frequency signal component below a predetermined level and for increasing the value of the bias signal current to a relatively large value only when the input signal includes a low frequency component above said predetermined level, said control means comprising a control element which changes its internal resistance upon receiving said control signal and variably controls the amounts of attenuation of the bias signal current passing said control means.

2. The AC bias control recording system as defined in claim 1 which further comprises a second control means which is supplied with said control signal and controls the level of the high frequency signal component in the input signal to be recorded transmitted through said transmission line in response to said control signal, said second control means controlling the bias current so as to increase the level of the high frequency signal component of the input signal to be recorded when said signal to be recorded includes a low frequency signal component above a predetermined level.

3. The AC bias control recording system as defined in claim 2 in which said means for obtaining the control signal consisting of a first means for obtaining a first control signal to be supplied to the first control means which control the bias current in response to the obtained low frequency signal component and a second means for obtaining a second control signal to be supplied to said second control means in response to the filtered low frequency signal component.

4. The AC bias control recording system as defined in claim 2 wherein said second control means also serves as a compressor for enforcing the high frequency signal component of the input signal to be recorded when the level of the high frequency signal component is small.

* * * * *